Patented Aug. 6, 1929.

1,723,169

UNITED STATES PATENT OFFICE.

EDWARD F. HEYDT, OF MONTCLAIR, NEW JERSEY, ASSIGNOR TO PETROLEUM DERIVATIVES COMPANY, A CORPORATION OF NEW JERSEY.

CLEANING COMPOSITION CONTAINING ISOPROPYL ALCOHOL.

No Drawing.  Application filed May 21, 1927.  Serial No. 193,384.

This invention relates to detergents and relates especially to a detergent composition containing isopropyl alcohol, tertiary butyl alcohol and water.

In the practice of my invention I prefer to use isopropyl alcohol and tertiary butyl alcohol of petroleum origin, preferably obtained from the unsaturated constituents of still gases by absorption in sulphuric acid and subsequent treatment with water to liberate the alcoholic bodies. From such process there may be separated by fractionation isopropyl alcohol and tertiary butyl alcohol. In my detergent composition the proportion of isopropyl alcohol usually is considerably greater than the content of tertiary butyl alcohol. The latter as a modifying agent, I prefer to have present ordinarily only in comparatively small proportion.

The detergent composition preferably has an alcoholic strength calculated on the basis of the two alcohols, of approximately 45 to 50 per cent. The balance of the composition is preferably water with or without additions of coloring agents, aromatic substances, or odor yielding constituents, as may be desired.

A water-free or substantially anhydrous mixture of isopropyl alcohol and tertiary butyl alcohol evaporates quite rapidly when used as a detergent, and, of course, possesses a certain measure of inflammability. I have observed that the mixture of the two alcohols with water present to the extent of 50 per cent, possesses a pronounced detergent action, and while not suitable for all those purposes to which the anhydrous mixture may be employed, has, nevertheless, the advantage of a slower rate of evaporation, and, in many cases, a lesser tendency to rub up or disturb the surface to which the detergent is rather energetically applied. By incorporation with water to the extent of 50 per cent, or thereabouts, a practically non-inflammable fluid, or, at least, one which will extinguish a lighted match when the latter is plunged into it, is obtained.

In addition to this a composition in which isobutyl alcohol is the major alcoholic constituent and containing about 50 per cent of water, generally speaking, has a greater antiseptic or germicidal action than the concentrated alcohol. That is, maximum antiseptic dilution represents a composition containing about 50 percent alcohols with the butanol representing from about 2 to 3½ per cent of the complete mixture.

Therefore, using the preferred formula of the present invention I obtain not only maximum antiseptic action, but a reduced rate of evaporation and a considerable reduction in inflammability. Furthermore, the detergent has a somewhat smooth and slippery feeling when applied to textures for cleansing purposes, and this I consider an advantage.

A suitable composition consists of highly purified isopropyl alcohol 46 per cent, tertiary butyl alcohol 2 to 4 per cent, and water from 42 to 50 per cent.

This forms a clear solution or liquid detergent vehicle in which the rather pungent odor of the isopropyl alcohol, or the tertiary butyl alcohol, as obtained from petroleum, may be masked by the addition of only very small quantities of pleasantly odoriferous substances.

While I prefer a composition containing about 50 per cent of the alcoholic bodies, thereby securing a particularly effective antiseptic action and a practically non-inflammable effect, I may proportion the water to the alcoholic components to obtain various other compositions varying somewhat from the illustrative one. Thus, I may reduce the alcoholic components to say, 30 per cent, on the one hand, or may increase to say, 70 per cent on the other hand, the content of water being varied in consequence. Likewise, the proportion of isopropyl alcohol to that of the tertiary butyl alcohol may be varied more or less, preferably keeping the content of the tertiary butyl alcohol relatively low, in order that it may serve more as a modifying agent for the isopropyl alcohol, than to yield of itself positive or pronounced detergent qualities. While I have set forth in the illustrative formula a composition containing from 2 to 4 per cent of tertiary butyl alcohol, I may introduce larger quantities, for example, 5 to 15 per cent, and still have a composition containing the modifying alcoholic body in minor proportion.

A composition which I have also found effective is composed of 60 parts of a mixture of isopropyl and tertiary butyl alcohol to 40 parts of water. The proportions given in the foregoing are all by volume.

Thus my invention embraces a detergent composition comprising water, isopropyl alcohol and tertiary butyl alcohol (both of the latter preferably being of petroleum origin) the proportion of alcohols being substantially at maximum antiseptic dilution, said composition being substantially non-inflammable at room temperature (65° F.), having a rate of evaporation substantially less than that of concentrated isopropyl alcohol and possessing the quality of rubbing-smoothness whereby the texture of the surface cleaned with said composition remains unimpaired.

What I claim is:—

1. A detergent composition comprising water, isopropyl alcohol and tertiary butyl alcohol, the proportion of alcohols being substantially at maximum antiseptic dilution; said composition being substantially non-inflammable at room temperature (65° F.), having a rate of evaporation substantially less than that of concentrated isopropyl alcohol and possessing the quality of rubbing-smoothness whereby the texture of the surface cleaned with said composition remains substantially unimpaired.

2. A detergent composition containing isopropyl alcohol, a minor proportion of tertiary butyl alcohol, and sufficient water to give the composition a relatively slow rate of evaporation.

3. A detergent composition containing from 30 to 70 per cent of a mixture of isopropyl alcohol and tertiary butyl alcohol and from 70 to 30 per cent of water, the tertiary butyl alcohol being but a minor proportion of the alcoholic content.

4. A detergent composition containing 46 per cent of isopropyl alcohol, from 2 to 4 per cent of tertiary butyl alcohol, and water the percentages being based on the entire composition.

EDWARD F. HEYDT.